Dec. 13, 1932.                R. SOLLICH                    1,890,533
PROCESS AND APPARATUS FOR MANUFACTURING SUGAR SWEETMEATS AND THE LIKE
                    Filed March 5, 1930         2 Sheets-Sheet 1

Inventor:
R. Sollich
By Wm H Reid
Attorney

Dec. 13, 1932.  R. SOLLICH  1,890,533
PROCESS AND APPARATUS FOR MANUFACTURING SUGAR SWEETMEATS AND THE LIKE
Filed March 5, 1930  2 Sheets-Sheet 2

Inventor:
R. Sollich
By Wm H Reid
Attorney

Patented Dec. 13, 1932

1,890,533

UNITED STATES PATENT OFFICE

ROBERT SOLLICH, OF ROSTOCK, GERMANY

PROCESS AND APPARATUS FOR MANUFACTURING SUGAR SWEETMEATS AND THE LIKE

Application filed March 5, 1930, Serial No. 433,432, and in Germany March 7, 1929.

The usual commercial caramel or other sugar sweetmeats formed in solid blocks, manufactured from boiled or melted sugar with the addition of flavouring and the like, have the drawback that they are somewhat difficult to bite. Also, the small volume of the blocks in relation to their weight is often found to be a disadvantage.

The invention consists in a process and apparatus for manufacturing sugar sweetmeats of boiled or melted caramel in flat or folded films having a large surface and small weight, so that they easily disintegrate and quickly dissolve in the mouth. They can, as long as they are in a viscous or plastic condition, be grooved, crinkled, compressed, rolled up or in any suitable manner provided with an uneven surface. They can be worked up into rods, bars or small pieces having a folded or porous configuration and can be easily broken up and bitten and readily dissolve on the tongue.

An essential features of the new process consists in delivering sugar to be treated in a plastic or viscous condition to a pair of notched or comb rollers with peripheral grooves, the tops of which seize the ribbon of sugar and draw it out in its longitudinal direction and, if required, groove it longitudinally. It was not obvious that notched or comb rollers of this kind could be employed for working up the sugar which easily adheres to metal parts.

An apparatus for carrying out the process according to the invention is represented in the accompanying drawings.

Figure 1:
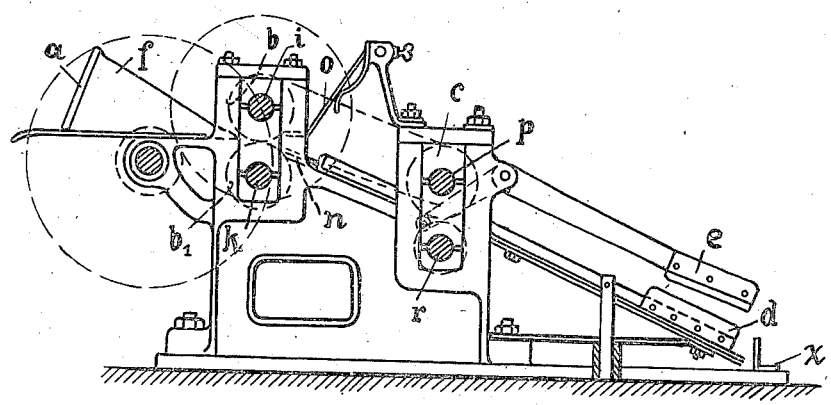
Figure 2:
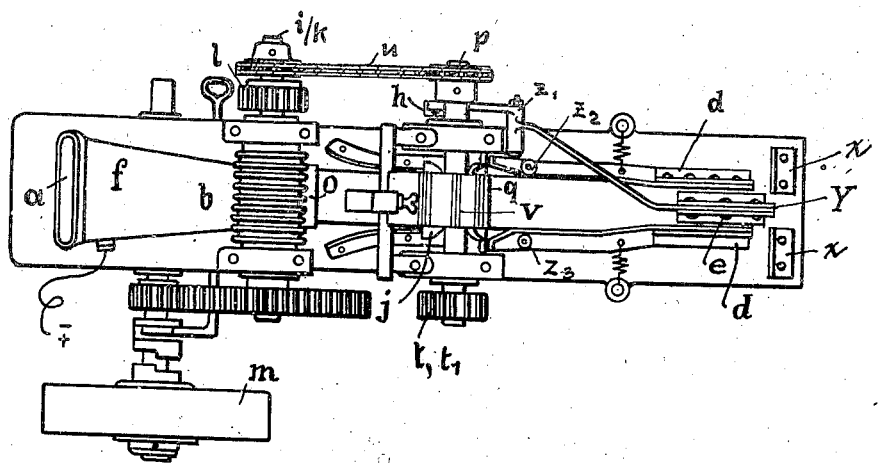
Figure 3:
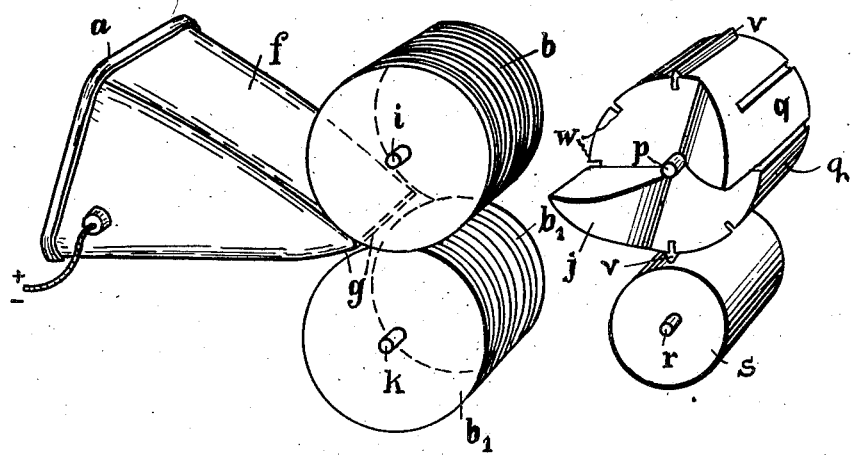
Figure 5:
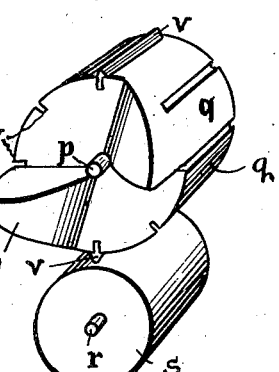
Figure 4:
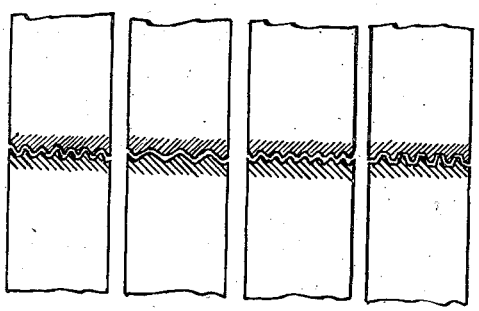
Figure 6:
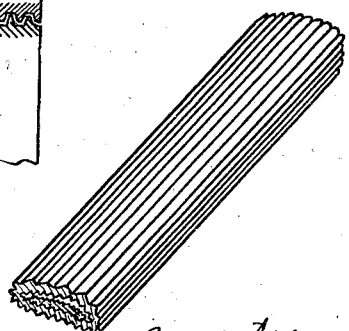

Fig. 1 is a side elevation of the apparatus.
Fig. 2 is a plan.
Fig. 3 shows in perspective the rollers and the hopper.
Fig. 4 is an axial section through a modified construction of the pair of rollers.
Fig. 5 is a perspective view of a pair of rollers for cutting up the sugar ribbon.
Fig. 6 is a perspective view of a rod manufactured from a grooved sugar ribbon.
Fig. 7 is a plan of the upper cutting roller with cam-actuated levers for compressing the sugar material.

The sugar to be treated, which has been previously boiled or melted, is supplied from a hopper $a$, preferably electrically heated, the walls of the casing $f$ of which converge to a discharge outlet $g$ of medium width. The sugar, in the form of a thick ribbon, is seized by a pair of rollers $b$, $b_1$ which are mounted on shafts $i$ and $k$ and are rotated at the same speed, but in the opposite direction, by gear wheels $l$. The roller $b$ can be connected, when required, to an operating mechanism $m$. Both rollers $b$ and $b_1$ are provided with peripheral teeth engaging one another.

The two rollers exert scarcely any squeezing or milling action, but mainly a spinning effect; they seize the viscous sugar, as it leaves the outlet $g$ of the hopper $a$, engage it frictionally by the top-portions of these notches and, due to their velocity of rotation and their small diameter, draw it so rapidly forwards that it is spun out to a thin film which has a less thickness than the width of the free space between the two rollers.

The rotating teeth facilitate the retention of the sugar by friction, stretch the film in the direction of working, and impart to it a grooved form which still further diminishes the thickness of the film or ribbon and essentially facilitates the subsequent compression at right angles to the direction of working.

The teeth or notches on the periphery of the rollers may be grooved or notched in various manners, preferably in a winded or pinked outline (see Fig. 4). The film or ribbon provided with longitudinal grooves leaves the rollers at the side opposite to the discharge slot $g$ and is moved forwards towards the cutting apparatus $c$ on a chute, while the rollers $b$ and $b_1$ are cleansed, if necessary from the particles adhering to them by scrapers $o$ and $n$ engaging in the peripheral grooves of the rollers.

The cutting or dividing apparatus consists of an upper roller $q$ mounted on an axle $p$ and a lower roller $s$ mounted on an axle $r$. The roller $q$ driven by a chain drive $u$ from the shaft $i$ of the roller mechanism drives the lower, smooth cutting roller $s$ by gear wheels $t$, $t_1$ at the same speed of rotation, and has on its periphery several cutting or crushing blades $v$ disposed parallel to the axis of the roller which are exchangeably inserted in grooves $w$ of the roller $q$. The circumferential velocity of the roller $s$ corresponds to the speed of movement of the sugar ribbon or films. The circumferential velocity of the cutting roller $q$ is, on the other hand, somewhat greater, so that the blades $v$ cut up intermittently and push forward the film without retaining it, and also disintegrate any remaining filaments.

The number of the blades $v$ can be selected according to the required length of the parts of the film to be cut off.

The cut off portions slide on an inclined path to stops $x$, $x$ and are then compressed by levers $d$, $d$ controlled by cams $j$ mounted on the front portions of the cutting roller $q$ and pivoted at $z_2$ and $z_3$. The lever $e$ pivoted at $z_1$, controlled by cam $h$ mounted on the axle $r$, presses downwards on the compressed substances, completes the formation of the rods as shown in Fig. 6 and retains them when the levers $d$, $d$ return to their original position. As soon as the lever $e$ releases the rod, the latter slides through the space between the two stops $x$, $x$ and can then be packed up or subjected to a further treatment.

This further treatment might consist in filling the hollow spaces between the separate layers with a soft material (for example, nougat, chocolate or the like), if this has not been already provided before the rod has been formed. The whole rod or the like can finally be dipped in a chocolate material.

I claim:

1. A process for manufacturing sugar sweetmeats that consists in forming a ribbon of medium thickness of viscous, plastic condition of a material of melted sugar prepared with the required ingredients, undulating and spinning out said ribbon in its breadth and longitudinal direction to a thin film, thereupon dividing the so prepared sugar film, and then forming the cut off portions into sweetmeat pieces of folded configuration.

2. A process for manufacturing sugar sweetmeats that consists in forming a ribbon of medium thickness of viscous, plastic condition of a material of melted sugar prepared with the required ingredients, undulating and spinning out said ribbon in its breadth and longitudinal direction to a thin film by feeding it to a pair of peripherally notched toothed rollers which grip the sugar material only with the top portions of their teeth and draw it forwards at such a speed as to give to the sugar ribbon entering the rollers a smaller area than that of the free space between said rollers, thereupon dividing the so prepared sugar film, and then forming the cut off portions into sweetmeat pieces of folded configuration.

3. A process for manufacturing sugar sweetmeats that consists in forming a ribbon of medium thickness of viscous, plastic condition of a material of melted sugar prepared with the required ingredients, undulating and spinning out said ribbon in its breadth and longitudinal direction to a thin film by feeding it to a pair of peripherally notched toothed rollers which grip the sugar material only with the top portions of their teeth and draw it forwards at such a speed as to give to the sugar ribbon entering the rollers a smaller area than that of the free space between said rollers, thereupon dividing the so prepared sugar film, and then forming the cut off portions to sweetmeat pieces of folded configuration by automatically pushing together the flat portions in three directions.

4. In an apparatus for making sugar sweetmeats, a pair of peripherally notched toothed rollers spaced apart to provide over their entire breadth an undulated gap between them, means for driving the rollers at such a speed as to spin out the sugar ribbon gripped by the teeth to a thin film of smaller area than the gap between the two opposite rollers, means for cutting the undulated sugar film and advancing the cut off portions, and means arranged to automatically push together the film pieces to form commercial sweetmeats of folded, porous configuration.

5. In an apparatus for making sugar sweetmeats, a pair of peripherally notched toothed rollers spaced apart to provide leaving over their entire breadth an undulated gap between them, means for driving the rollers at such a speed as to spin out the sugar ribbon gripped by the teeth to a thin film of smaller area than the gap between the two opposite rollers, the distance of the top portion of the teeth of the one roller from the bottom of the clearings of the opposite roller being greater than the thickness of the sugar film, means for cutting the undulated sugar film and advancing the cut off portions, and means arranged to automatically push together the film pieces to form commercial sweetmeats of folded, porous configuration.

6. In an apparatus for making sugar sweetmeats, a pair of peripherally notched toothed rollers spaced apart to provide over their entire breadth an undulated gap between them, means for driving them at such a speed as to spin out the sugar ribbon gripped by the teeth to a thin film of smaller area than the gap between the two opposite rollers, said teeth of each roller engaging the grooves of the other roller deeply enough for ensuring the sugar film to be spun out in its breadth but standing at a greater distance from the bottom of the engaged clearings of the opposite roller than would correspond to the thickness of the sugar film, another pair of rollers arranged to cut the undulated film and advance the cut off portions, and means arranged to automatically push together the film pieces to form commercial sweetmeats of folded, porous configuration.

7. In an apparatus for making sugar sweetmeats, a pair of peripherally notched spaced rollers arranged to undulate a sugar ribbon fed to said rollers and draw out in its breadth and longitudinal direction without filling the gap between said rollers, a pair of cutting rollers, one of which is provided with blades, means for rotating the latter rollers and rotating the bladed cutting roller at a circumferential velocity greater than both the circumferential velocity of the other cutting roller and the velocity of the sugar film, and means to automatically push together the cut off portions to form commercial sweetmeats of folded, porous configuration.

8. In an apparatus for making sugar sweetmeats, a pair of peripherally notched spaced rollers arranged to undulate a sugar ribbon fed to said rollers and draw it out in its breadth and longitudinal direction without filling the gap between said rollers, a pair of cutting rollers, one of which is provided with blades, means for rotating the cutting rollers and rotating the last-named cutting roller with a circumferential velocity greater than both the circumferential velocity of the other cutting roller and the velocity of the sugar film, cam-controlled levers arranged one on each side of the film and one above it, and means for actuating said levers to automatically push together the cut off film portions to form commercial sweetmeats of folded, porous configuration.

9. In an apparatus for making sugar sweetmeats, a pair of peripherally notched spaced rollers arranged to undulate a sugar ribbon fed to said rollers and draw it out in its breadth and longitudinal direction without filling the gap between said rollers, a pair of cutting rollers, one of which is provided with blades, means for rotating the cutting rollers and rotating the last-named cutting rollers with a circumferential velocity greater than both the circumferential velocity of the other cutting roller and the velocity of the sugar film, levers arranged one on each side of the film and one above it, cams connected with the shafts of the cutting rollers arranged to actuate the levers to automatically push together the cut off film portions to form commercial sweetmeats of folded, porous configuration.

In testimony whereof I affix my signature.

ROBERT SOLLICH.